US010911539B2

(12) United States Patent
Karande et al.

(10) Patent No.: US 10,911,539 B2
(45) Date of Patent: Feb. 2, 2021

(54) MANAGING SHARED CONTENT DIRECTORY STRUCTURE METADATA

(71) Applicant: Box, Inc., Redwood City, CA (US)

(72) Inventors: Advait D. Karande, Foster City, CA (US); Alok Ojha, Newark, CA (US); Deepak Khajuria, San Jose, CA (US)

(73) Assignee: Box, Inc., Redwood City, CA (US)

( * ) Notice: Subject to any disclaimer, the term of this patent is extended or adjusted under 35 U.S.C. 154(b) by 95 days.

(21) Appl. No.: 16/243,036

(22) Filed: Jan. 8, 2019

(65) Prior Publication Data
US 2020/0220928 A1 Jul. 9, 2020

(51) Int. Cl.
*H04L 29/08* (2006.01)
*H04L 29/06* (2006.01)
*G06F 16/185* (2019.01)
*G06F 9/50* (2006.01)

(52) U.S. Cl.
CPC ........ *H04L 67/1097* (2013.01); *G06F 9/5016* (2013.01); *G06F 16/185* (2019.01); *H04L 65/403* (2013.01)

(58) Field of Classification Search
None
See application file for complete search history.

(56) References Cited

U.S. PATENT DOCUMENTS

| | | |
|---|---|---|
| 9,239,762 B1 | 1/2016 | Gunda et al. |
| 2004/0117369 A1 | 6/2004 | Mandal et al. |
| 2004/0225719 A1 | 11/2004 | Kisley et al. |
| 2012/0066231 A1* | 3/2012 | Petersen ................. G06Q 30/02 707/748 |
| 2012/0159854 A1* | 6/2012 | Fujisaki ................. E05F 11/445 49/351 |
| 2013/0204849 A1 | 8/2013 | Chacko |
| 2014/0040446 A1 | 2/2014 | Cohen et al. |

(Continued)

FOREIGN PATENT DOCUMENTS

WO 2018039091 A1 3/2018

OTHER PUBLICATIONS

International Search Report and Written Opinion dated Feb. 26, 2019 for PCT Appln. No. PCT/US2017/047710.

*Primary Examiner* — Davoud A Zand
(74) *Attorney, Agent, or Firm* — Vista IP Law Group, LLP

(57) ABSTRACT

Methods, systems and computer program products for managing shared content directory structure metadata stored on client devices. A method embodiment includes identifying a collaboration system that stores one or more content objects that are organized in accordance with a directory structure. Requests pertaining to the content objects are raised by processing entities running on the client device. The requests include instructions to retrieve one or more of multiple types of metadata associated with the directory elements that constitute the directory structure. Based on timing and patterns of requests pertaining to the content objects, a monitoring function detects unwanted runaway retrieval by a runaway process. To prevent further unwanted runaway retrieval of the metadata, the runaway process is blocked from continuing its pattern of unwanted (runaway) retrieval. The collaboration system is notified of characteristics of the runaway process. Some or all of the unwanted retrievals are remediated automatically.

20 Claims, 11 Drawing Sheets

(56) References Cited

U.S. PATENT DOCUMENTS

| | | | |
|---|---|---|---|
| 2014/0313281 A1* | 10/2014 | Graff | H04L 65/80 |
| | | | 348/14.09 |
| 2014/0330874 A1 | 11/2014 | Novak et al. | |
| 2015/0019686 A1* | 1/2015 | Backholm | H04W 4/18 |
| | | | 709/217 |
| 2015/0309838 A1 | 10/2015 | Steele | |
| 2018/0046635 A1 | 2/2018 | Nichols | |
| 2018/0059990 A1 | 3/2018 | Christiansen et al. | |
| 2018/0060345 A1 | 3/2018 | Christiansen et al. | |
| 2018/0060350 A1 | 3/2018 | Christiansen et al. | |
| 2018/0084044 A1 | 3/2018 | Nichols et al. | |

\* cited by examiner

MANAGING SHARED CONTENT DIRECTORY STRUCTURE METADATA

FIELD

This disclosure relates to collaboration systems, and more particularly to techniques for managing shared content directory structure metadata.

BACKGROUND

Modern cloud-based collaboration systems have matured enough to be able to manage very large corpora of shared content (e.g., millions of files comprising many terabytes of data) stored in very large computing systems implemented in the cloud. A set of directories, folders, hierarchies of directories of folders, etc. of such numerous content objects are managed by the cloud-based collaboration systems.

Users of such cloud-based collaboration systems can view the folders, hierarchies of directories of folders using a virtual file system that runs on a client device. A virtual file system running on a client device presents a view of the hierarchies of directories and folders and content items. Such a virtual file system can present a representation (e.g., a graphical view, in a graphical user interface) of the directories, folders and content items, even though the actual data comprising content items might be stored at the cloud-based collaboration system.

In many cases, the client device supports a viewer that allows a user to interact with the representations of the content items stored at the cloud-based collaboration system. In some cases, the representations of the content items derive from metadata that describes aspects of the content items stored at the cloud-based collaboration system. Such metadata can include relatively small metadata items such as the name of a file, or such metadata can include relatively large metadata items such as lists of collaborators, pre-formatted icons or previews, indexes, etc. As such, the metadata as a whole can be relatively large, and can increase over time.

In a naïve model, when a user needs to access the contents of a file for local access (e.g., for local editing, offline manipulation, etc.), the user can view portions of the directory structure and select an element (e.g., file icon, hyperlink, etc.) that represents the file. Such a selection (e.g., touching, clicking, etc.), causes a copy of the file to be downloaded from the cloud to the user device. In many situations, automated processes such as virus checkers, music library managers, etc., emulate the aforementioned naïve model during traversal of the directory structure. As such, during processing (e.g., to check for viruses, or to check for music library compatibility, etc.) the directory structure becomes successively more and more populated as the automated processes traverse the directory.

Unfortunately, especially in the aforementioned situations where a very large corpus of files and its associated directory structure are stored at a cloud-based collaboration system, the directory structure formed in response to requests made by automated processes can overwhelm the storage resources of a user device. In some cases, the metadata alone can completely fill the available storage space at the user device, rendering the user device inoperable. What is needed are techniques to avoid overwhelming a user device with the directory structure metadata associated with cloud-based shared content. More specifically, what is needed is a technique or techniques that address unwanted retrieval of shared content directory structure metadata due to the actions of automated processes.

SUMMARY

The present disclosure describes techniques used in systems, methods, and in computer program products for managing shared content directory structure metadata, which techniques advance the relevant technologies to address technological issues with legacy approaches. More specifically, the present disclosure describes techniques used in systems, methods, and in computer program products for managing runaway retrieval of metadata associated with cloud-based shared content. Certain embodiments are directed to technological solutions for intercepting requests from automated processes to prevent unwanted retrieval of metadata associated with directory structures of cloud-based shared content.

The disclosed embodiments modify and improve over legacy approaches. In particular, the herein-disclosed techniques provide technical solutions to avoid unwanted retrieval of shared content directory structure metadata due to free-running of automated processes. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demands for computer storage. For example, when performing computer operations that eliminate or reduce unwanted retrieval of shared content directory structure metadata due to automated processes, both storage usage as well as CPU cycles demanded are significantly reduced as compared to the storage usage and CPU cycles that would be needed but for the practice of the herein-disclosed techniques.

In one specific case of such improvements, when intercepting requests from automated processes to prevent unwanted retrieval of metadata associated with directory structures of cloud-based shared content, the level of consumption of local storage capacity (e.g., at a user device) is significantly reduced because none or only portions of the metadata associated with directory structures are stored using the storage resources of the user device. Furthermore, the networking resources consumed by retrieval of unwanted metadata is also reduced or eliminated. Still further, in addition to significantly reducing levels of use of storage resources, the overall performance of the system is improved since a user device no longer needs to perform retrieval of unwanted metadata over the network and thus other functions are processed faster (i.e., because they are unencumbered by retrieval of unwanted data), which leads to overall faster response times.

Many of the herein-disclosed embodiments for intercepting requests from automated processes to prevent unwanted retrieval of metadata associated with directory structures of cloud-based shared content are based on technological solutions that pertain to technological problems that arise in hardware and software arts that underlie many types of collaboration systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
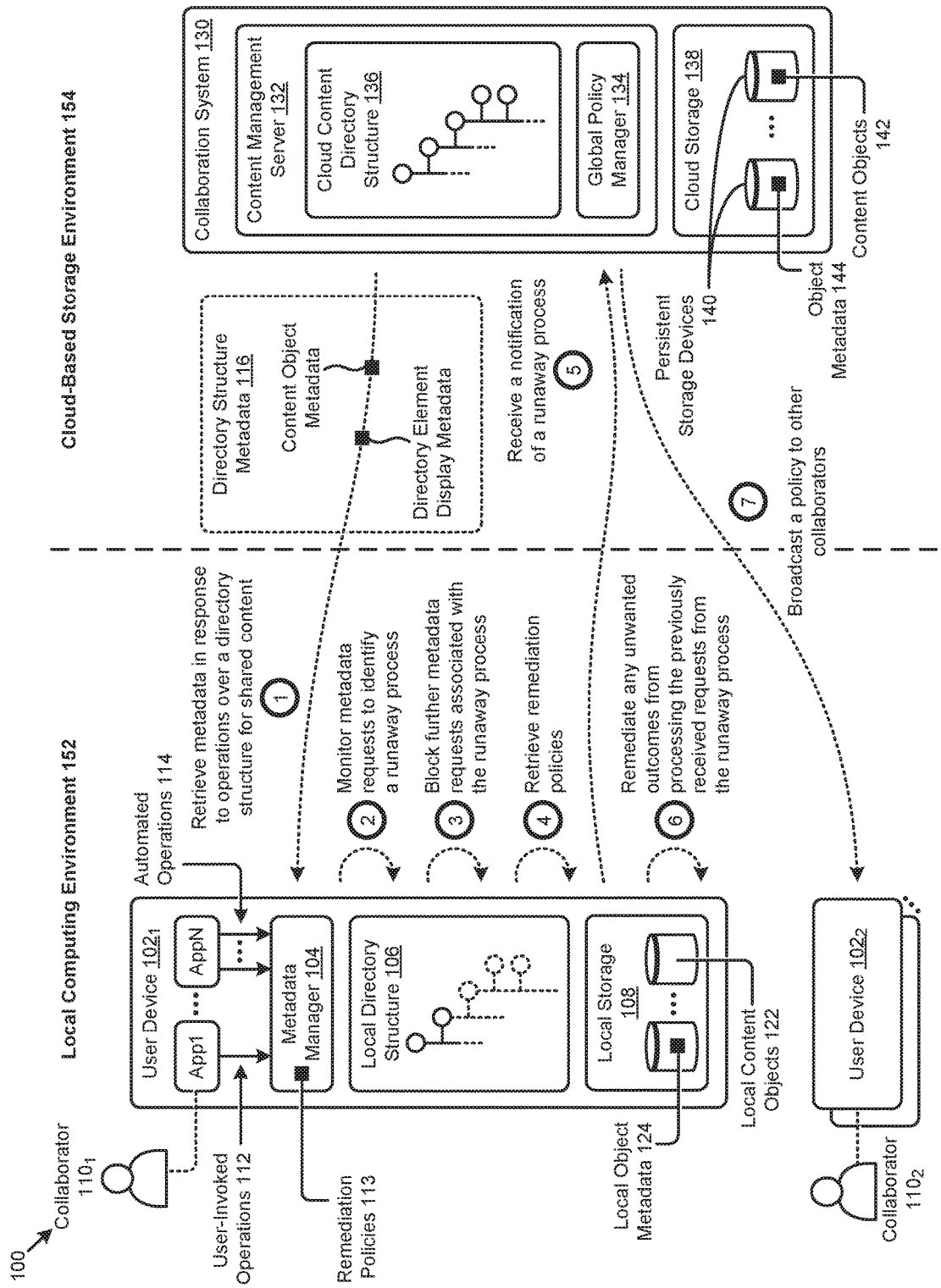
FIG. 1 illustrates a computing environment in which embodiments of the present disclosure can be implemented.

Aspects of the present disclosure solve problems associated with retrieval of shared content directory structure metadata due to runaway automated processes. These problems are unique to, and may have been created by, various computer-implemented features of collaboration systems. Some embodiments are directed to approaches for intercepting requests from automated processes to prevent unwanted retrieval of metadata associated with directory structures of cloud-based shared content. The accompanying figures and discussions herein present example environments, systems, methods, and computer program products for managing runaway retrieval of metadata associated with cloud-based shared content.

Overview

Disclosed herein are techniques for intercepting requests from automated processes to prevent unwanted retrieval of metadata associated with directory structures of cloud-based shared content. In certain embodiments, a collaboration system that manages a plurality of shared content objects accessed by users at respective user devices is identified. Such collaboration systems manage an extensive set of directory structure metadata that describes the logical organization (e.g., directory structure) of the content objects. Furthermore, such collaboration systems manage an extensive set of directory structure metadata that describes characteristics (e.g., identification information, access permissions, collaboration activity, preformatted previews, etc.) of the individual content objects.

Various applications at the user devices invoke processes that result in at least some of the directory structure metadata being requested from the collaboration system. Such requests are monitored to identify so-called runaway processes. A runaway process is a processing entity (e.g., a job, task, thread or other sequence of instructions) that exceeds one or more thresholds or limits when performing automated requests for retrieval of directory structure metadata and/or other content metadata, and/or retrievals of the shared content itself. When a runaway processing entity is identified, further requests from the runaway processing entity are intercepted and "spoofed" with a response that prevents unwanted retrieval of further directory structure metadata by that processing entity. In certain embodiments, the activity of a runaway processing entity prior to its detection is tracked to facilitate remediation (e.g., removal) of any unwanted directory structure metadata that had been retrieved on behalf of the runaway processing entity. In certain embodiments, a local metadata remediation policy is enforced at the user device. In certain embodiments, a retrieval policy is formed and broadcast to other user devices so as to enable proactive blocking of identified runaway processing entity at those other user devices.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to intercepting requests from automated processes to prevent unwanted retrieval of metadata associated with directory structures of cloud-based shared content. Specifically, the figure presents a logical depiction of how the herein disclosed techniques can be implemented in a collaboration environment that comprises a cloud-based storage environment and multiple instances of local computing environments. A set of high order operations are presented to illustrate how the herein disclosed techniques can be used in such collaboration environments to block and/or otherwise manage unwanted retrieval of shared content directory structure metadata requested by certain automated processes.

The logical depiction of FIG. 1 illustrates a cloud-based storage environment 154 and a local computing environment 152. Cloud-based storage environment 154 comprises a collaboration system 130 that facilitates collaboration over large volumes of shared content objects by a plurality of users (e.g., collaborators). As can be observed, collaboration system 130 comprises one or more instances of a content management server 132 with access to areas of cloud storage 138 (e.g., storage areas of the shown persistent storage devices 140) that stores instances of the shared content for shared access (e.g., by user devices of the local computing environment 152.

More specifically, a content object from a collection of content objects 142 is stored at cloud storage 138 and accessed by and/or collaborated over by one or more of the collaborators. As an example, a collaborator $110_1$ might interact (e.g., create, view, edit, etc.) with a particular content object using a client device (e.g., user device $102_1$) in local computing environment 152. A collaborator $110_2$ might also interact with the same content object at a user device $102_2$. One or more other collaborators might interact with the same content object and/or other content objects with their respective user devices within local computing environment 152 or within other local computing environments. For certain interactions (e.g., editing) with a content object by the collaborators, an instance of the content object is downloaded from cloud-based storage environment 154 to local computing environment 152. For example, a content object from the content objects 142 might be downloaded from collaboration system 130 to a set of local content objects 122 stored in a local storage 108 at user device $102_1$ to facilitate editing of the content object by collaborator $110_1$.

A set of object metadata 144 associated with content objects 142 is also stored at cloud storage 138. Object metadata 144 is managed by collaboration system 130 for various purposes. In one such purpose, object metadata 144 describes certain attributes associated with each of the content objects 142, such as a name (e.g., file name), an object identifier, a version identifier, a physical storage location, various access permissions, one or more preformatted previews of the object, and/or other attributes. Content management server 132 may also use object metadata 144 and/or other information to manage collaboration activities performed by the collaborators over the content objects that comprise content objects 142. Specifically, for example, content management server 132 can manage concurrent access to instances of content objects 142 by multiple collaborators (e.g., collaborator $110_1$, collaborator $110_2$, and other collaborators) and resolve editing and/or versioning conflicts that might arise from the concurrent access.

Object metadata 144 also comprises directory structure metadata that describes cloud content directory structure 136 associated with content objects 142. A directory structure, such as the shown cloud content directory structure 136, is a logical representation of the organization of a set of content objects. Such directory structures facilitate discovery of the content objects associated with the directory structures by processes or users. Directory structures are often defined as a collection of elements (e.g., nodes) that are hierarchically associated with parent elements (e.g., except for the highest order parent element or "root" element) and child elements, as depicted in cloud content directory structure 136.

As an example, each element in the cloud content directory structure 136 might represent a content object or a group (e.g., folder) of content objects. In this case, a first set of directory structure metadata from object metadata 144 might characterize the elements (e.g., identifiers and names of the underlying object or folder) and relationships between the elements (e.g., identifiers of parent or child elements associated with a particular element) of the cloud content directory structure 136. Such metadata can be used, for example, to visually display the directory structure in a user interface. A second set of directory structure metadata from object metadata 144 might describe characteristics of the underlying content objects or groups of content objects associated with the elements of cloud content directory structure 136. In this case, such metadata might be used, for example, to present a summary and/or preview of a content object associated with cloud content directory structure 136.

As earlier described, the foregoing sets of directory structure metadata from object metadata 144 that describe the cloud content directory structure 136 can consume vast amounts of storage capacity in cloud storage 138, particularly in situations where a very large corpus of content objects are managed by collaboration system 130. As such, to accommodate the smaller storage capacity (e.g., as compared to cloud storage 138) of user device $102_1$, merely a portion of the directory structure metadata might be retrieved by user device $102_1$ and stored in a set of local object metadata 124 in local storage 108. More specifically, merely the directory structure metadata required to populate a local directory structure 106 at user device $102_1$ is retrieved and stored.

As depicted in the figure, not all of the elements of cloud content directory structure 136 are populated in local directory structure 106. In some cases, the extent of the directory structure metadata retrieved to populate the local directory structure 106 is based at least in part on the interactions of collaborator $110_1$ over the local directory structure 106. For example, as collaborator $110_1$ explores the local directory structure 106 (e.g., in a file explorer interface), merely the directory structure metadata associated with each element of the directory structure touched by collaborator $110_1$ is retrieved from collaboration system 130. In other cases, however, the directory structure metadata is retrieved in response to operations invoked from certain automated processes. In such cases, the retrieved metadata can overwhelm the storage capacity of user device $102_1$.

According to the embodiment of FIG. 1, the herein disclosed techniques manage the retrieval of directory structure metadata requested by certain automated processes at least part by implementing an instance of a metadata manager 104 at user device $102_1$. Metadata manager 104 facilitates retrieval of instances of directory structure metadata 116 from collaboration system 130 in response to operations associated with certain portions (e.g., one or more elements) of a directory structure (e.g., cloud content directory structure 136) that corresponds to a collection of shared content objects (operation 1). Such operations might comprise common file system operations such as open, enumerate, read, write, rename, and/or other operations.

As depicted in the embodiment of FIG. 1, metadata manager 104 receives instances of user-invoked operations 112 from application App1 to retrieve certain instances of directory structure metadata 116. As an example, user-invoked operations 112 might be issued in response to interactions of collaborator $110_1$ with application App1. Metadata manager 104 also receives sequences of automated operations 114 from an application AppN. Such automated operations might be invoked, for example, by an automated process associated with application AppN that is configured to traverse all the elements of local directory structure 106.

More specifically, application AppN might comprise components of virus scan applications or might comprise components of photo discovery applications that have an automated process configured to traverse some or all of the elements (e.g., files, folders, etc.) associated with local directory structure 106 (e.g., to perform virus checks, discover photos, etc.). As shown, the directory structure metadata 116 is a combination of two distinct types of metadata: (1) directory element display metadata (e.g., a filename), and (2) content object metadata (e.g., object ownership indications, collaborators and respective roles, object access permissions, security policies, preformatted previews, etc.). In exemplary cases the size of the directory element display metadata is small (e.g., hundreds of bytes or less) relative to the size of the content object metadata which can be significantly larger (e.g., many kilobytes or megabytes or more).

To protect the user device $102_1$ from storage of large amounts of unwanted metadata retrieved in response to operations from the foregoing automated processes, metadata manager 104 monitors all the directory structure metadata requests derived from the operations (e.g., user-invoked operations 112, automated operations 114, other operations, etc.) issued by the processes to identify one or more runaway processes (operation 2). A runaway process, as used herein, is a process that performs operations that result in one or more requests for directory structure metadata that are determined to be unwanted. As an example, a runaway process might be an automated process associated with an application. In this case, the runaway process might rapidly issue a sequence of operations to populate an entire directory structure associated with a large corpus of content objects, which can result in the storage facility of a user device being overwhelmed with directory structure metadata.

As shown in this embodiment, when a runaway process is identified, further directory structure metadata requests associated with the runaway process are blocked by metadata manager 104 (operation 3). In some cases, the runaway process is halted or suspended or killed using operating system commands. In other cases, rather than issuing an OS command to halt or suspend or kill a particular runaway process, metadata manager 104 issues responses to the requests from the runaway process that "spoof" the process so as to prevent actual retrieval of further directory structure metadata. For example, a runaway process that requests the population of a folder in local directory structure 106 might be denied access to the folder by metadata manager 104. Alternatively, for example, a runaway process that requests the population of a folder in local directory structure 106 might receive a "null value" or "empty list" when attempting to access portions of the local directory structure. In some cases, an application that includes activities that are deemed as runaway activities can operate over the entirety of a local file system, and only certain requests made by the application are spoofed. Specifically, an application such as a virus checker might issue requests for retrieval of directory structure metadata beginning at some root-level directory entry and below. As such, it can happen that requests for retrieval of directory structure metadata that pertain to the local file system contents other than shared content (e.g., other than shared content derived from cloud storage 138) might be satisfied without being spoofed. However, when the virus checker issues requests for retrieval of directory structure metadata that pertains to the shared content, then the metadata manager 104 may spoof the response. In this and other situations pertaining to handling requests for retrieval of directory structure metadata, not only is the retrieval of directory structure metadata associated with a directory entry blocked, but also retrieval of directory structure metadata associated with any child elements of the folder are also blocked.

The foregoing are merely example alternatives to halting or suspending or killing a particular runaway process to prevent unwanted retrieval of metadata, however the foregoing techniques could be applied for preventing unwanted retrieval of the underlying data itself (e.g., content objects 142). Further there are many alternatives in various combinations for preventing unwanted retrieval of metadata. Strictly as examples, retrieval of underlying data might be allowed or denied based on the type of data comprising the underlying data. Or, retrieval of different types or classes of metadata might be allowed or denied based on the type of metadata. Still further, retrieval of different types or classes of data or metadata might be allowed or denied based on a scoring regime, where different types or classes of data or metadata are scored based on a set of quantitative criteria, and then, based on the score, the retrieval request is either granted (e.g., when the score meets or exceeds a given threshold), or denied (e.g., when the score is below a given threshold).

In some cases the determination of whether or not to satisfy a retrieval request is based on logic or heuristics that augment or supersede the aforementioned scoring against quantitative criteria. Such logic or heuristics might include item-specific mechanisms to handle the data or metadata, and such item-specific mechanisms can include item-specific characteristics such as (1) whether or not the item is in a collaboration group, (2) whether or not the item has been accessed by a collaborator, (3) whether or not the item has been accessed by a collaborator within a particular time window, (4) whether or not the folder containing the item has been accessed by a collaborator within a particular time window, etc.

A variety of other alternatives might be specified in a set of remediation policies 113, which remediation policies might specify a plurality of responses to a runaway process, and/or which remediation policies might specify actions to be taken by the user device even in absence of a network connection with the collaboration system (operation 4). For example, a runaway process might operate in the background (e.g., during "idle" periods) and/or during periods when the user device is offline. As such, the embodiment of FIG. 1, in particular, the availability of remediation policies on the user device facilitate blocking, detection, and remediation at any moment in time when the user device is operational—even if offline. The remediation policies can comprise local remediation policies that are specific to a particular device type or operating system, or such local remediation policies can be formed from all or parts of any other remediation policies from any source.

However, when the user device is online, and when a runaway process is discovered, metadata manager 104 sends a notification of detection of the runaway process to a global policy manager 134 at content management server 132 of collaboration system 130 (operation 5). Using the information delivered in the notification, global policy manager 134 generates a policy that is broadcast to one or more user devices (operation 7).

The policy (e.g., a metadata retrieval policy, a content object retrieval policy, a process invocation allow/deny policy, an operation allow/deny policy, etc.) is accessed by respective instances of the user devices, and aspects of the policy are enforced so as to block any further directory structure metadata requests associated with instances of the runaway process specified in the policy. As one example, in situations where multiple user devices have a particular virus scan application installed on the devices, requests for directory structure metadata associated with a certain process (or thread or job or other executable entity) that is identified as a runaway process can be proactively blocked from being served at the user devices.

It is often the case where several unwanted requests for directory structure metadata are served before the process associated with the unwanted requests is identified as a runaway process according to the herein disclosed techniques. In these cases, the outcomes of the requests associated with the runaway process that were issued prior to identification of the runaway process can be remediated (operation 6). Specifically, some or all of the unwanted instances of directory structure metadata retrieved in response to operations from a runaway process can be deleted from user device $102_1$.

The foregoing directory structure metadata management (e.g., monitoring, blocking, remediation, etc.) capabilities facilitated by the herein disclosed techniques result in improvements in computer functionality that serve to reduce the demand for computer processing power, reduce the demand for computer memory and data storage, reduce network bandwidth use, and reduce the demand for inter-component communication in computing environments. Specifically, applications of the herein disclosed techniques reduce the consumption of computing, storage, and networking resources by eliminating retrieval and storage of unwanted directory structure metadata and/or other metadata.

One embodiment of techniques for managing shared content metadata, such as directory structure metadata, is disclosed in further detail as follows.

Figure 2:
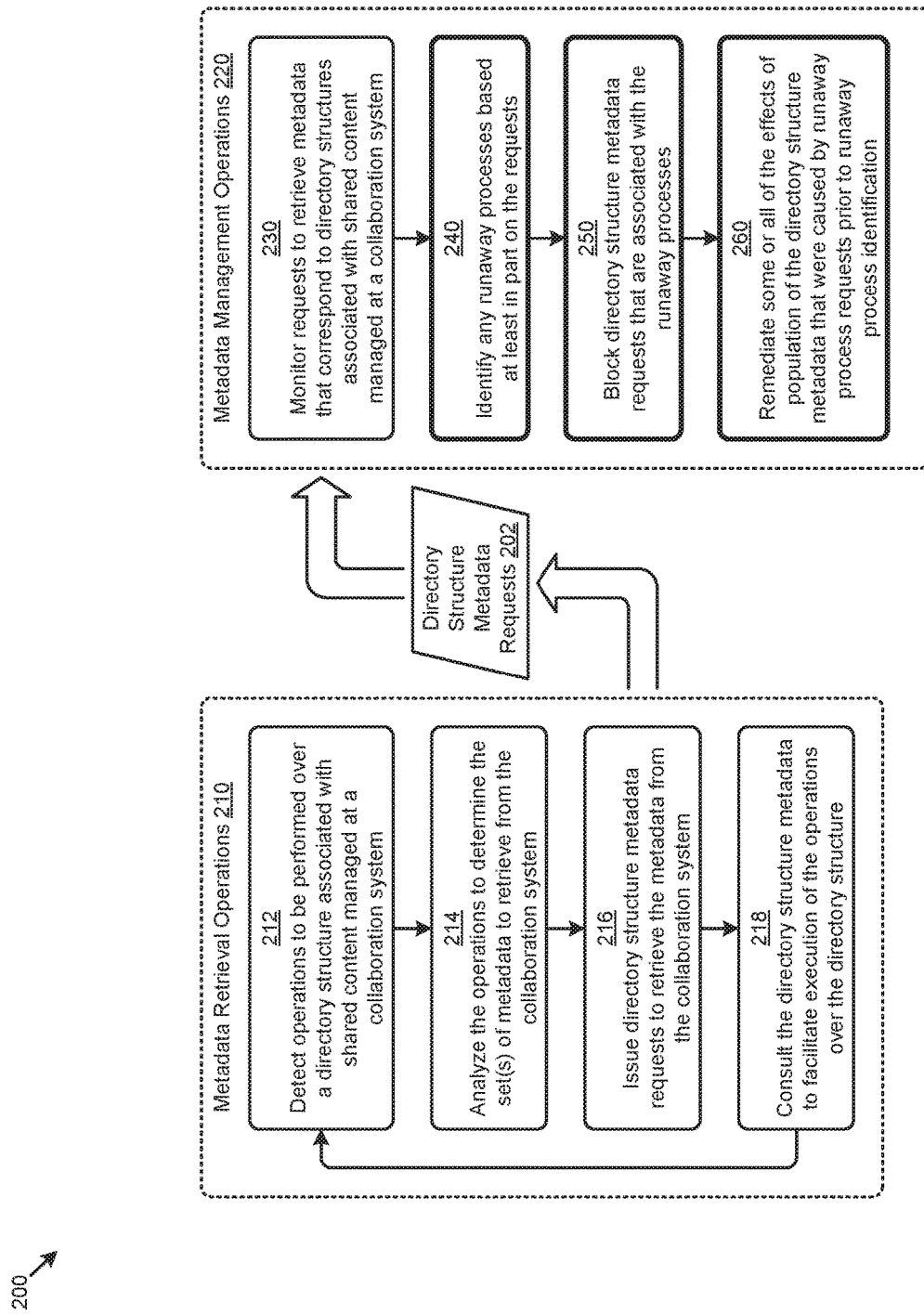
FIG. 2 depicts a shared content metadata management technique as implemented in systems that manage runaway retrieval of metadata associated with cloud-based shared content, according to an embodiment.

FIG. 2 depicts a shared content metadata management technique 200 as implemented in systems that manage runaway retrieval of metadata associated with cloud-based shared content. As an option, one or more variations of shared content metadata management technique 200 or any aspect thereof may be implemented in the context of the architecture and functionality of the embodiments described herein. The shared content metadata management technique 200 or any aspect thereof may be implemented in any environment.

FIG. 2 illustrates aspects pertaining to intercepting requests from automated processes to prevent unwanted retrieval of metadata associated with directory structures of cloud-based shared content. Specifically, the figure is presented to illustrate one embodiment of certain steps and/or operations performed over a network of devices (e.g., user devices, content management servers, etc.) in a collaboration environment to manage the distribution of directory structure metadata over the environment. As can be observed, the steps and/or operations can be grouped into a set of metadata retrieval operations 210 and a set of metadata management operations 220.

The metadata retrieval operations 210 comprise one embodiment of steps and/or operations that are implemented to retrieve certain sets of directory structure metadata from a collaboration system in response to operations corresponding the directory structure described by the directory structure metadata. For example, various operations might be invoked by one or more processes associated with one or more applications to view and/or otherwise access a certain portion of a directory structure that is described by a respective set of directory structure metadata. The metadata management operations 220 comprise one embodiment of steps and/or operations that are implemented to intercept automated directory structure metadata requests associated with such processes to prevent unwanted retrieval of directory structure metadata in accordance with the herein disclosed techniques.

The metadata retrieval operations 210 of shared content metadata management technique 200 can commence by detecting operations to be performed over at least a portion of a directory structure associated with a collection of shared content objects that are managed at a collaboration system (step 212). As earlier mentioned, the directory structure defines the logical organization of the content objects and/or certain groups (e.g., folders) of the content objects. Since the elements of such directory structures are often described by metadata, operations over some or all of the directory structures can result in one or more directory structure metadata requests 202.

Specifically, the detected operations are analyzed to determine the set of metadata to retrieve from the collaboration system (step 214). For example, some operations (e.g., rename) might pertain to a small set of metadata that is used to merely display a directory structure element icon and name in a user interface, whereas other operations (e.g., open) might pertain to a larger set of metadata that comprises summary information, one or more preformatted previews, and/or other rich information pertaining to a directory structure element that represents a particular content object.

One or more directory structure metadata requests (e.g., directory structure metadata requests 202) are then issued to retrieve the directory structure metadata from the collaboration system (step 216). Such directory structure metadata requests might be in the form of a "list" command or a "listdir" command, or another command that is processed by the file system.

The retrieved metadata is consulted to facilitate execution of the operations over the directory structure (step 218). As can be observed, the steps and/or operations of metadata retrieval operations 210 are continually repeated as instances of operations are detected and processed. For example, hierarchically lower levels of directories might be iteratively retrieved.

In some cases, certain instances of directory structure metadata requests 202 associated with various processes (e.g., automated processes) can result in unwanted sets of directory structure metadata being retrieved and stored (e.g., at a user device). To address the problems attendant to such unwanted requests and metadata, the metadata management operations 220 are implemented to monitor the requests (e.g., directory structure metadata requests 202) to retrieve metadata that correspond to directory structures associated with shared content objects managed at a collaboration system (step 230). By monitoring the directory structure metadata requests, any runaway processes associated with the requests can be identified (step 240). For example, the request frequency of each of the processes associated with such requests might be observed to identify one or more of the processes as runaway processes. Any further requests associated with the runaway processes are blocked (step 250). As an example, rather than respond to a request associated with a runaway process by retrieving the requested directory structure metadata, a response is returned to the runaway process so as to prevent retrieval and storage of any directory structure metadata. Such a response might return, for example, one or more file system error codes, an access denial, or an empty content indicator.

In some cases, several requests associated with a later identified runaway process might have been executed in accordance with the metadata retrieval operations 210 (i.e., the earlier requests prior to runaway process detection were not blocked). The outcomes of such executed requests might include storage of unwanted directory structure metadata at a local device. Such outcomes associated with requests associated with runaway processes prior to their detection can be remediated (step 260). For example, some or all of the aforementioned unwanted directory structure metadata might be deleted from the local device. More specifically, one remediation approach might retain the smaller sets of directory structure metadata that pertain to displaying directory structure elements, while deleting the more voluminous portions of directory structure metadata that pertain to renditions of and/or attributes of the underlying content objects.

One embodiment of a system, data flows, and data structures for implementing the shared content metadata management technique 200 and/or other herein disclosed techniques is disclosed as follows.

Figure 3A:
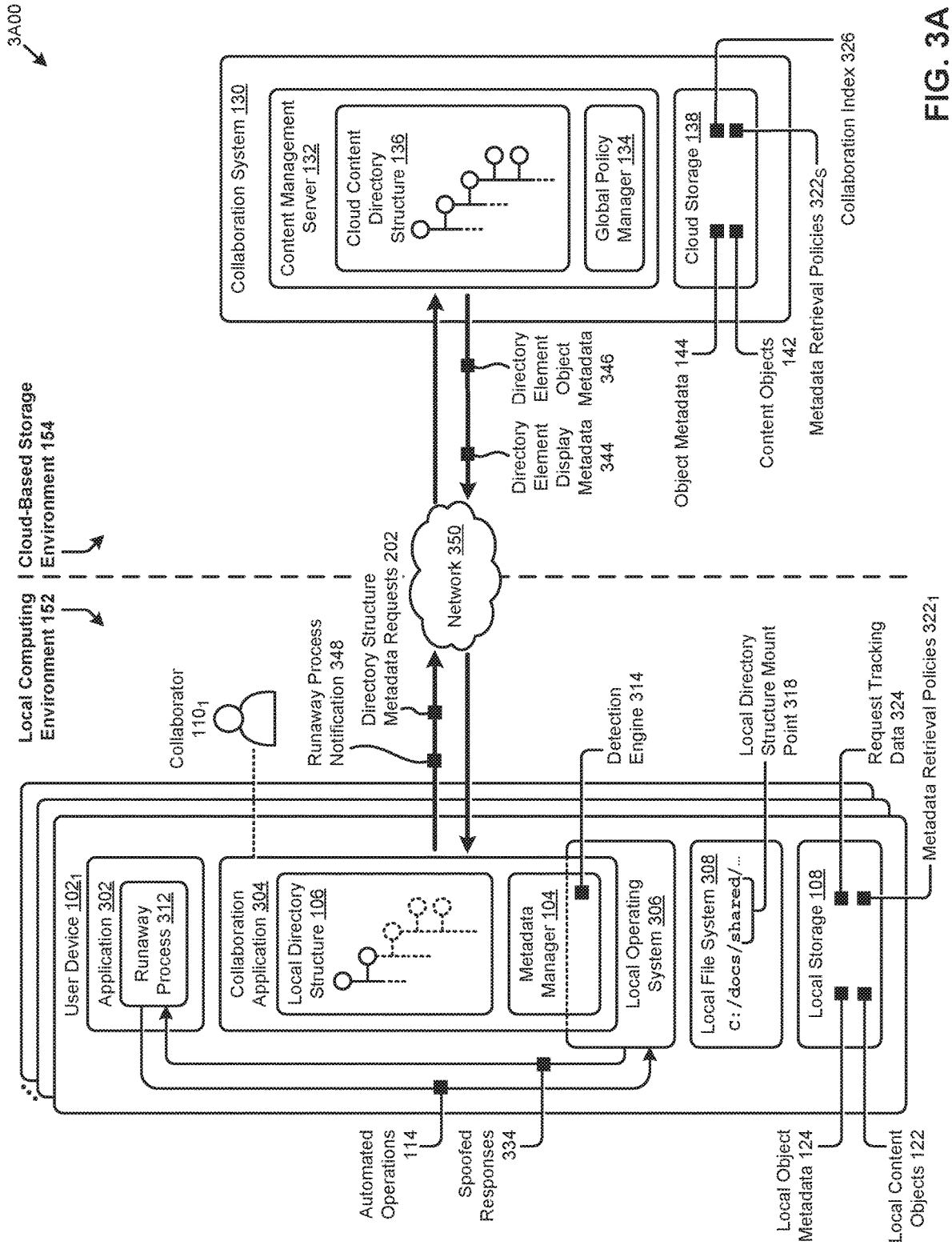
FIG. 3A is a block diagram of a system that manages runaway retrieval of metadata associated with cloud-based shared content, according to an embodiment.

FIG. 3A is a block diagram of a system 3A00 that manages runaway retrieval of metadata associated with cloud-based shared content. As an option, one or more variations of system 3A00 or any aspect thereof may be implemented in the context of the architecture and functionality of the embodiments described herein. The system 3A00 or any aspect thereof may be implemented in any environment.

FIG. 3A illustrates aspects pertaining to intercepting requests from automated processes to prevent unwanted retrieval of metadata associated with directory structures of cloud-based shared content. Specifically, the figure is being presented to show one embodiment of certain representative components and associated data flows that describes how the herein disclosed techniques might be implemented in a collaboration environment that comprises a cloud-based storage environment 154 and one or more instances of a local computing environment 152. The components, data flows, and data structures shown in FIG. 3A present one partitioning and associated data manipulation approach. The specific example shown is purely exemplary, and other subsystems, data structures, and/or partitioning are reasonable.

As shown, system 3A00 comprises several components earlier described. Specifically shown are user device $102_1$ accessed by collaborator $110_1$ in local computing environment 152 and collaboration system 130 in cloud-based storage environment 154. User device $102_1$, collaborator $110_1$, and local computing environment 152 represent a plurality of user devices and corresponding collaborators and local computing environments that might be associated with a particular remote (e.g., cloud-based) content management system and storage environment. As earlier described, the collaboration system 130 comprises one or more instances of a content management server 132 that accesses various instances of shared content objects (e.g., content objects 142) and associated object metadata (e.g., object metadata 144) stored in cloud storage 138. Object metadata 144 comprises certain directory structure metadata that describes the cloud content directory structure 136 at collaboration system 130. An instance of global policy manager 134 is implemented at content management server 132.

A collaboration index 326 is also stored in cloud storage 138. Collaboration index 326 is accessed by content management server 132 and/or global policy manager 134 at content management server 132 to facilitate the herein disclosed techniques and/or other techniques implemented at collaboration system 130. A collaboration index 326, as used herein, is a set of data records that describe the relationships between users (e.g., collaborators), between content objects, and/or between users and content objects. For example, certain data in collaboration index 326 might identify (e.g., by a user identifier) all of the users in a particular collaboration group (e.g., the engineering department of an enterprise), or identify (e.g., by an object identifier) the content objects that a set of users have accessed or have been invited to access.

Furthermore, a set of metadata retrieval policies $322_S$ that are managed and/or otherwise accessed by global policy manager 134 at content management server 132 are stored in cloud storage 138. Such metadata retrieval policies, as used herein, are rule-based policies that identify runaway processes (e.g., by identifier, by name, by extension, etc.) and instructions for responding to directory structure metadata requests associated with the runaway processes. Specifically, a particular metadata retrieval policy $322_S$ might identify a runaway process by some unique identifier, a name, an executable file extension, and/or other attributes, and might define one or more responses (e.g., deny access, return an error message, return an empty object, etc.).

The response to the runaway process can be based at least in part on the type of operation (e.g., open, enumerate, read, write, rename, etc.) and/or the type of directory structure metadata request (e.g., a request for display metadata, a request for object metadata, etc.) that is associated with the runaway process. In some cases, a particular metadata retrieval policy might allow a runaway process to perform only certain specific types of directory structure metadata requests. Strictly as one example, a metadata retrieval policy might specify that a runaway process—even after being identified as such—might not be blocked from performing certain read-only type operations.

As further shown in system 3A00, an instance of a collaboration application 304 is installed on user device $102_1$ to facilitate interactions with the content objects 142 by collaborator 110₁. In certain embodiments, collaboration application 304 comprises executable code that is delivered by collaboration system 130 for installation on user device 102₁. Various instances of local content objects 122 and local object metadata 124 that correspond to instances of content objects 142 and object metadata 144, respectively, are stored in the local storage 108 of user device 102₁. An instance of metadata manager 104 comprising a detection engine 314 is implemented in collaboration application 304 and/or other instances of collaboration applications installed at other user devices in the collaboration environment.

As can be observed, collaboration application 304 manages the local directory structure 106 at user device 102₁. Operations (e.g., view folder contents) over local directory structure 106 invoked by collaborator 110₁ through collaboration application 304 are detected and processed directly by metadata manager 104. In response to such interactions at collaboration application 304, for example, metadata manager 104 forwards instances of directory structure metadata requests 202 over a network 350 to content management server 132 to retrieve respective instances of directory structure metadata from object metadata 144 to store in local object metadata 124. As shown, directory structure metadata might comprise a set of directory element display metadata 344 and/or a set of directory element object metadata 346, and/or any combination thereof. Directory element display metadata 344 might comprise a small set of metadata that is used to merely display a directory structure element icon and name in a user interface, whereas the directory element object metadata 346 might be a larger set of metadata that comprises summary information, one or more preformatted previews, and/or other rich information pertaining to a directory structure element that represents a particular content object or group of content objects.

As shown, local directory structure 106 is mounted at a certain location of a local file system 308 associated with a local operating system 306 of user device 102₁. Specifically, the local directory structure might be mounted at a local directory structure mount point 318 of local file system 308. Furthermore, metadata manager 104 of collaboration application 304 listens to transactions executed at local operating system 306 of user device 102i. As such, certain applications and/or processes of those applications can perform operations over local directory structure 106 by issuing calls to local operating system 306 that pertain to local directory structure mount point 318 and its child directories at local file system 308.

As a representative scenario facilitated by the herein disclosed techniques, metadata manager 104 at user device 102₁ can monitor directory structure metadata requests that result from such operations over local directory structure 106 issued through local operating system 306 to identify any runaway processes that might be present at user device 102₁. Specifically, by monitoring the directory structure metadata requests at metadata manager 104, detection engine 314 has determined that a certain portion of the requests are derived from the automated operations 114 of a runaway process 312 at an application 302. For example, a request frequency trend for all processes at user device 102₁ might be stored in a set of request tracking data 324 at local storage 108 to facilitate identification of runaway process 312 by detection engine 314.

In response to identifying the runaway process 312, metadata manager 104 will block any further requests associated with operations from runaway process 312. Specifically, metadata manager 104 responds to such operations invoked by runaway process 312 with one or more spoofed responses 334 that serve to prevent any further retrieval of unwanted directory structure metadata. As earlier mentioned, spoofed responses 334 can comprise responses that indicate access to a particular directory structure element or collection of elements is denied, a particular directory structure element or collection of elements is empty, and/or indicate other information that serves to prevent further retrieval of unwanted directory structure metadata. As described in more detail herein, a directory structure metadata request history recorded in request tracking data 324 can be accessed by metadata manager 104 to remediate some or all of the outcomes (e.g., storage of unwanted directory structure metadata) that resulted from requests associated with runaway process 312 prior its identification as a runaway process.

Furthermore, in response to identifying the runaway process 312, metadata manager 104 issues a runaway process notification 348 over network 350 to global policy manager 134. The runaway process notification 348 provides information characterizing the runaway process 312. Global policy manager 134 uses the information in runaway process notification 348 to generate a metadata retrieval policy that is added to metadata retrieval policies 322$_S$ and broadcast over network 350 to various user devices. For example, certain instances of metadata retrieval policies 322$_S$ might be delivered to user device 102₁ and stored as metadata retrieval policies 322₁ in local storage 108.

In some embodiments, a collaboration index 326 might be accessed to select the user devices to receive the metadata retrieval policies. Strictly as one example, collaboration index 326 is consulted to identify the user devices of any collaborators that have a particular runaway process and/or applications or components associated with the runaway process installed on their devices. In other cases, a metadata retrieval policy serve as a global policy and as such, the global policy is issued to any and all user devices that might have access to content objects 142 at collaboration system 130.

Further details of the data structures associated with the foregoing stored data and/or other data objects accessed by the herein disclosed techniques are disclosed as follows.

Figure 3B:
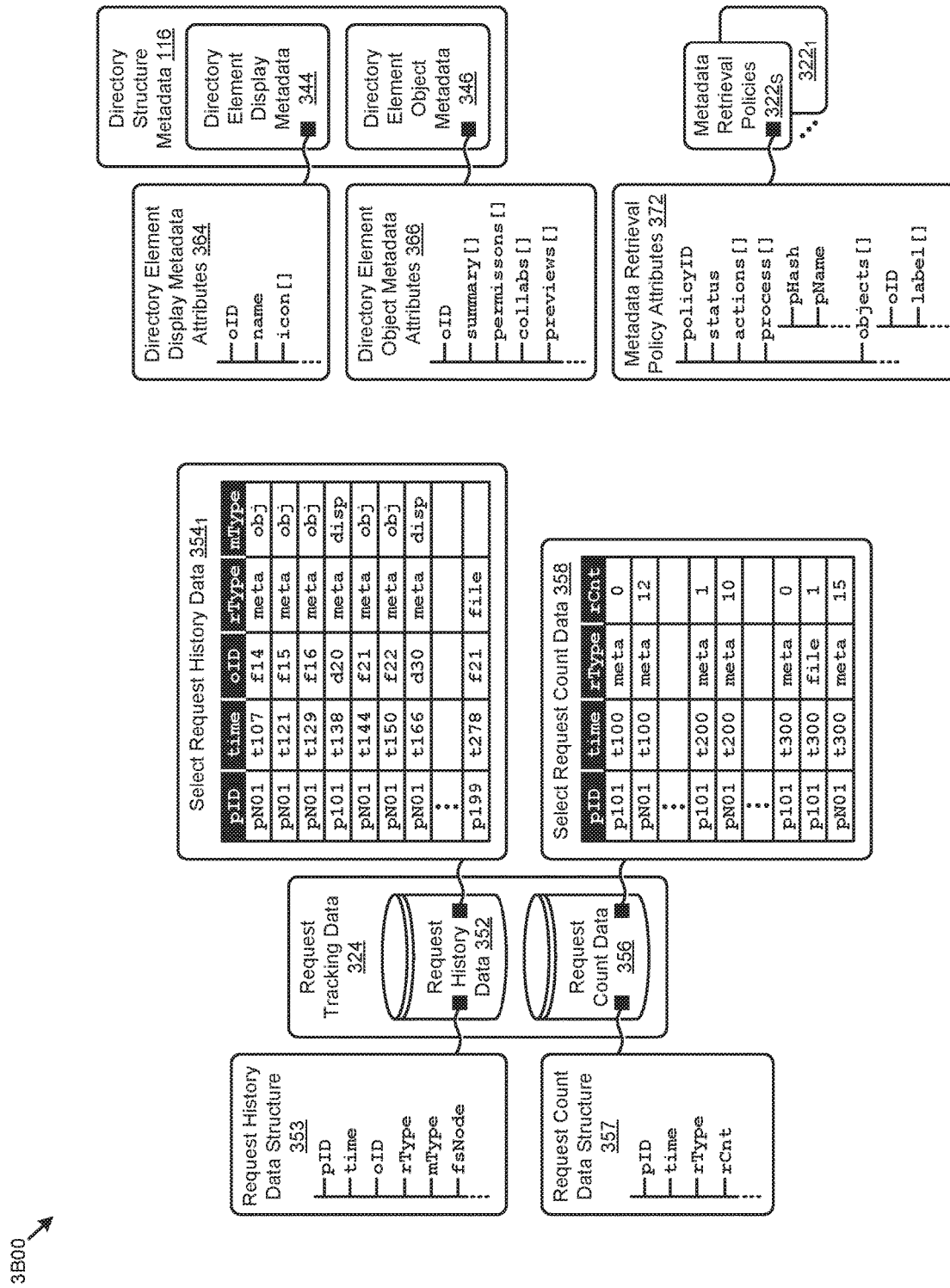
FIG. 3B depicts a set of representative data structures for organizing information in systems that manage runaway retrieval of metadata associated with cloud-based shared content, according to an embodiment.

FIG. 3B depicts a set of representative data structures 3B00 for organizing information in systems that manage runaway retrieval of metadata associated with cloud-based shared content. As an option, one or more variations of representative data structures 3B00 or any aspect thereof may be implemented in the context of the architecture and functionality of the embodiments described herein. The representative data structures 3B00 or any aspect thereof may be implemented in any environment.

FIG. 3B illustrates one aspect pertaining to intercepting requests from automated processes to prevent unwanted retrieval of metadata associated with directory structures of cloud-based shared content. Specifically, the figure is being presented to illustrate one embodiment of data structures that can be implemented to organize certain data used when implementing the herein disclosed techniques. More specifically, representative data structures 3B00 improve the way a computer uses data in memory and/or communicates with other computers when performing operations facilitated by the herein disclosed techniques.

Specifically shown in FIG. 3B are data structures associated with a set of request history data 352 and a set of request count data 356 that are included in request tracking data 324. Request history data 352 facilitates implementation of the herein disclosed techniques by codifying certain attributes associated with requests (e.g., directory structure metadata requests, etc.) issued over a network of devices in a collaboration environment. In certain embodiments, the requests are a result of certain operations performed by processes (e.g., runaway processes, etc.) at the devices. Request count data 356 facilitates implementation of the herein disclosed techniques by codifying the count, in a particular period of time, of requests from the foregoing processes. Request count data 356 can thereby be accessed to determine a request frequency for the processes.

FIG. 3B also presents data structures that correspond to directory element display metadata 344 and directory element object metadata 346, which represent two types of directory structure metadata 116. A representative data structure for codifying metadata retrieval policies (e.g., metadata retrieval policies $322_S$, metadata retrieval policies $322_1$, etc.) is also shown.

The data sets described herein can be organized and/or stored using various techniques. For example, the data comprising request history data 352 might be organized and/or stored in a tabular structure (e.g., relational database table) that has rows that relate various attributes, such as source process identifiers and request types, that pertain to a particular request (e.g., issued from a user device to a collaboration system). As another example, the information might be organized and/or stored in a programming code object that has instances corresponding to a particular request and properties corresponding to the various attributes associated with the request.

As depicted by a request history data structure 353, a data record (e.g., table row or object instance) for a particular request describes a source process identifier (e.g., stored in a "pID" field), a request time indicator (e.g., stored in a "time" field), an object identifier (e.g., stored in a "oID" field), a request type description (e.g., stored in an "rType" field), a metadata type (e.g., for metadata requests, stored in an "mType" field), a file system inode reference (e.g., stored in an "fsNode" field), and/or other request attributes.

As indicated by a set of select request history data $354_1$, the foregoing data structure captures both metadata requests (e.g., "rType=meta") and content object requests (e.g., "rType=file"). Furthermore, for metadata requests (e.g., to retrieve directory structure metadata), the type of metadata retrieved can be either display metadata (e.g., "mType=disp") or object metadata (e.g., "mType=obj"). For example, while a process associated with "p101" might perform operations that result in a single "meta" request at time "t138" followed by a "file" request at time "t278", a process (e.g., automated process) associated with "pN01" might perform operations that result in a sequence of "meta" requests at least from time "t107" to time "t166".

As depicted by a request count data structure 357, a data record (e.g., table row or object instance) for a particular process describes a source process identifier (e.g., stored in a "pID" field), a count time period indicator (e.g., stored in a "time" field), a request type description (e.g., stored in an "rType" field), a request count (e.g., stored in an "rCnt" field), and/or other request count attributes. As indicated by a set of select request count data 358, the foregoing data structure captures the count over a certain time period of both metadata requests (e.g., "rType=meta") and content object requests (e.g., "rType=file"). For example, in time period "t300", "1" request of type "file" was associated with process "p101". As another example, process "pN01" had "10" requests of type "meta" in time period "t200". As can be observed, process "pN01" exhibited a relatively large count of "meta" requests (e.g., "12", "10", and "15") over the respective time periods (e.g., "t100", "t200", and "t300").

As described herein, such a high request count or request frequency (e.g., count divided by time period) might indicate that process "pN01" is a runaway process. The determination of what constitutes a high request count or high request frequency can be configured through one or more threshold parameters. In some cases, such threshold parameters are included in a policy. As such, a global policy manager 134 might generate a global metadata retrieval policy 424 to broadcast the threshold parameters to various user devices 102. In some cases, a plurality of threshold parameters are defined for a corresponding plurality of processes. For example, a first threshold parameter value for process "p101" might be set to a first value, while a second threshold parameter value for process "pN01" might be set to a second value.

A set of directory element display metadata attributes 364 indicate that a data record (e.g., table row or object instance) comprising display information for a particular directory structure element describes an object identifier (e.g., a file or folder identifier, stored in an "oID" field), a name (e.g., a file or folder name, stored in a "name" field), an element icon (e.g., stored in an "icon [ ]" object), and/or other element display attributes. Furthermore, a set of directory element object metadata attributes 366 indicate that a data record (e.g., table row or object instance) comprising content object information for a particular directory structure element describes an object identifier (e.g., a file or folder identifier, stored in an "oID" field), a set of content object summary information (e.g., stored in a "summary [ ]" object), a set of content object access permissions (e.g., stored in a "permissions [ ]" object), a list of collaborators over the content object (e.g., stored in a "collabs [ ]" object), one or more preformatted previews of the content object (e.g., stored in a "previews [ ]" object), and/or other element object attributes.

As indicated by a set of metadata retrieval policy attributes 372, each metadata retrieval policy might describe a policy identifier (e.g., stored in a "policyID" field), a description of a policy status (e.g., "active" or "inactive", stored in a "status" field), a list of actions to carry out in accordance with the policy (e.g., stored in an "actions [ ]" object), a set of information characterizing a runaway process or processes associated with the policy (e.g., stored in a "process [ ]" object), a list of directory structure elements and/or content objects affected by the runaway process associated with the policy (e.g., stored in an "objects [ ]" object), and/or other information associated with the policy. As shown, each runaway process associated with the policy might also be described at least in part by a process hash (e.g., stored in a "pHash" field) or a process name (e.g., stored in a "pName" field). Furthermore, each of the list of directory structure elements and/or content objects affected by the runaway process associated with the policy might be identified by an object identifier (e.g., stored in an "oID" field) and classified according to a classification label (e.g., stored in a "label [ ]" object).

The foregoing discussions include techniques for identifying runaway processes based at least in part on the requests issued to retrieve directory structure metadata (e.g., step 240 of FIG. 2), which techniques are disclosed in further detail as follows.

Figure 4:
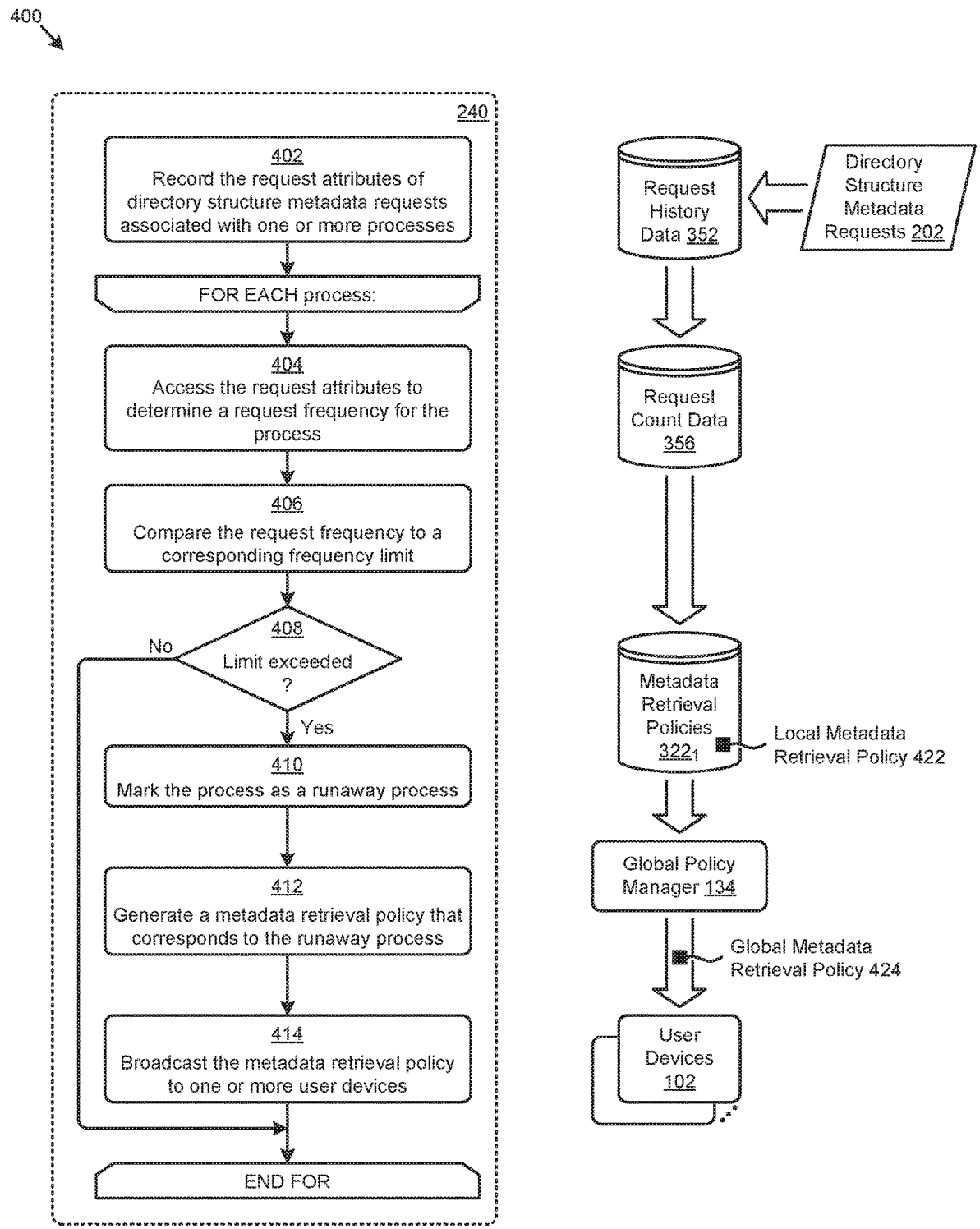
FIG. 4 presents a runaway process detection technique as implemented in systems that manage runaway retrieval of metadata associated with cloud-based shared content, according to an embodiment.

FIG. 4 presents a runaway process detection technique 400 as implemented in systems that manage runaway retrieval of metadata associated with cloud-based shared content. As an option, one or more variations of runaway process detection technique 400 or any aspect thereof may be implemented in the context of the architecture and functionality of the embodiments described herein. The runaway process detection technique 400 or any aspect thereof may be implemented in any environment.

FIG. 4 illustrates aspects pertaining to intercepting requests from automated processes to prevent unwanted retrieval of metadata associated with directory structures of cloud-based shared content. Specifically, the figure is presented to illustrate one embodiment of certain steps and/or operations that facilitate identifying runaway processes based at least in part on directory structure metadata requests issued in response to operations invoked by the processes (e.g., step 240 of FIG. 2). A representative scenario is also shown in the figure to illustrate an example application of runaway process detection technique 400.

Runaway process detection technique 400 can commence by recording the request attributes of directory structure metadata requests associated with one or more processes (step 402). For example, various attributes corresponding to directory structure metadata requests 202, which are issued in accordance with certain operations performed by one or more processes, are captured in request history data 352. For each process, the request attributes are accessed to determine a request frequency that corresponds to the process (step 404). In the illustrated scenario, a set of request count data 356 is derived from request history data 352. Specifically, the requests for a particular process over a particular time period are counted and the count is stored in request count data 356. As such, a request frequency for the process can be calculated.

The request frequency (e.g., calculated from request count data 356) is compared to a corresponding frequency limit (step 406) to determine whether or not the limit is exceeded. As an example, the frequency limit might be established by a system administrator and/or derived at least in part from historical request frequency trends. If the frequency limit is not exceeded ("No" path of decision 408), then the process is determined to not be a runaway process and no further action is taken with respect to that process. If the frequency limit is exceeded ("Yes" path of decision 408), then the process is marked as a runaway process (step 410) and a metadata retrieval policy that corresponds to the runaway process is generated (step 412). The metadata retrieval policy is then broadcast to one or more user devices (step 414).

As illustrated in the scenario of FIG. 4, a local metadata retrieval policy 422 (e.g., in metadata retrieval policies $322_1$) corresponding to the runaway process might first be established, and then a global policy manager 134 might generate a global metadata retrieval policy 424 to broadcast to various user devices 102. In some cases, when a frequency limit is exceeded, an alert is presented to one or more users (e.g., a system administrator) to confirm whether a particular process is to be identified as a runaway process.

The foregoing discussions include techniques for blocking directory structure metadata requests from runaway processes (e.g., step 250 of FIG. 2), which techniques are disclosed in further detail as follows.

Figure 5:
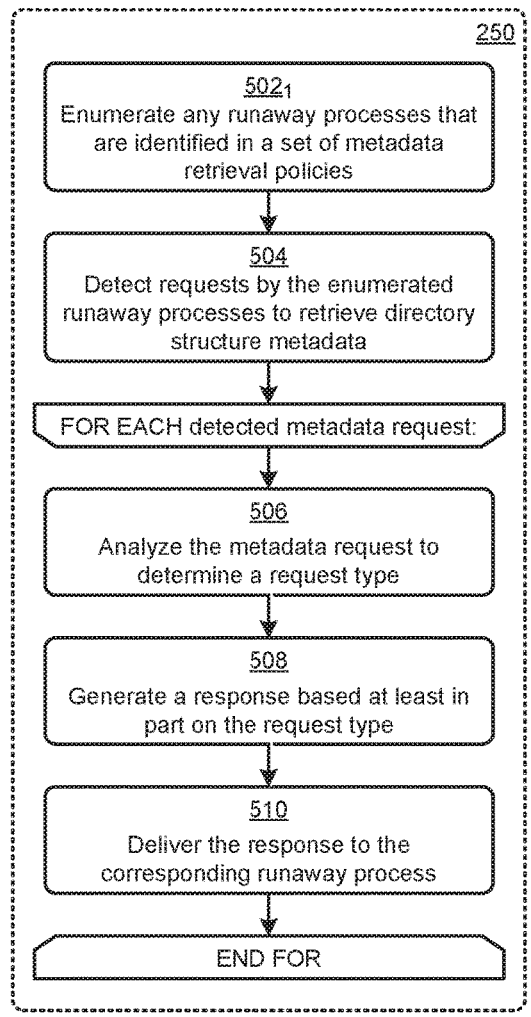
FIG. 5 presents a runaway process blocking technique as implemented in systems that manage runaway retrieval of metadata associated with cloud-based shared content, according to an embodiment.
Figure 5:
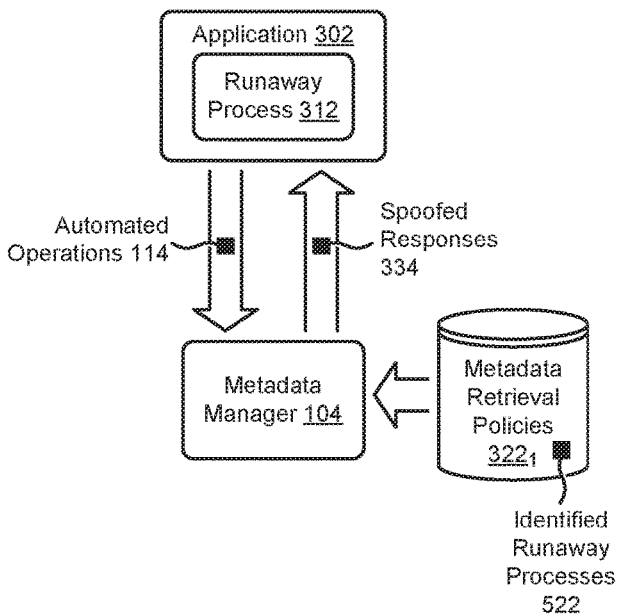

FIG. 5 presents a runaway process blocking technique 500 as implemented in systems that manage runaway retrieval of metadata associated with cloud-based shared content. As an option, one or more variations of runaway process blocking technique 500 or any aspect thereof may be implemented in the context of the architecture and functionality of the embodiments described herein. The runaway process blocking technique 500 or any aspect thereof may be implemented in any environment.

FIG. 5 illustrates aspects pertaining to intercepting requests from automated processes to prevent unwanted retrieval of metadata associated with directory structures of cloud-based shared content. Specifically, the figure is presented to illustrate one embodiment of certain steps and/or operations that facilitate blocking directory structure metadata requests from runaway processes (e.g., step 250 of FIG. 2). A representative scenario is also shown in the figure to illustrate an example application of runaway process blocking technique 500.

Runaway process blocking technique 500 can commence by enumerating any runaway processes that are identified in a set of metadata retrieval policies (step $502_1$). For example, a list of identified runaway processes 522 in metadata retrieval policies $322_1$ might be enumerated at metadata manager 104. Any directory structure metadata requests associated with the runaway processes are detected (step 504). For example, metadata manager 104 might detect one or more directory structure metadata requests that result from various instances of automated operations 114 invoked by runaway process 312 of application 302 over a particular directory structure.

For each detected directory structure metadata request, the request is analyzed to determine a request type (step 506). For example, the request might be formed in response to a particular operation (e.g., enumerate, open, read, write, etc.) to be performed over a particular directory structure element (e.g., file element, folder element, etc.). As such, the directory structure metadata request might request a particular type of metadata (e.g., display metadata, object metadata, etc.). A response is then generated based at least in part on the request type (step 508), which response is delivered to the runaway process that corresponds to the subject directory structure metadata request (step 510). As illustrated, metadata manager 104 might respond to automated operations 114 invoked by runaway process 312 with one or more spoofed responses 334 that serve to prevent any further retrieval of unwanted directory structure metadata.

While runaway process blocking technique 500 blocks directory structure metadata requests associated with a process identified as a runaway process, certain requests associated with the process may have been executed prior to the process being identified as a runaway process. The foregoing discussions include techniques for remediating some or all of the outcomes of such requests that are executed by a runaway process prior to identification of the runaway process (e.g., step 260 of FIG. 2), which techniques are disclosed in further detail as follows.

Figure 6:
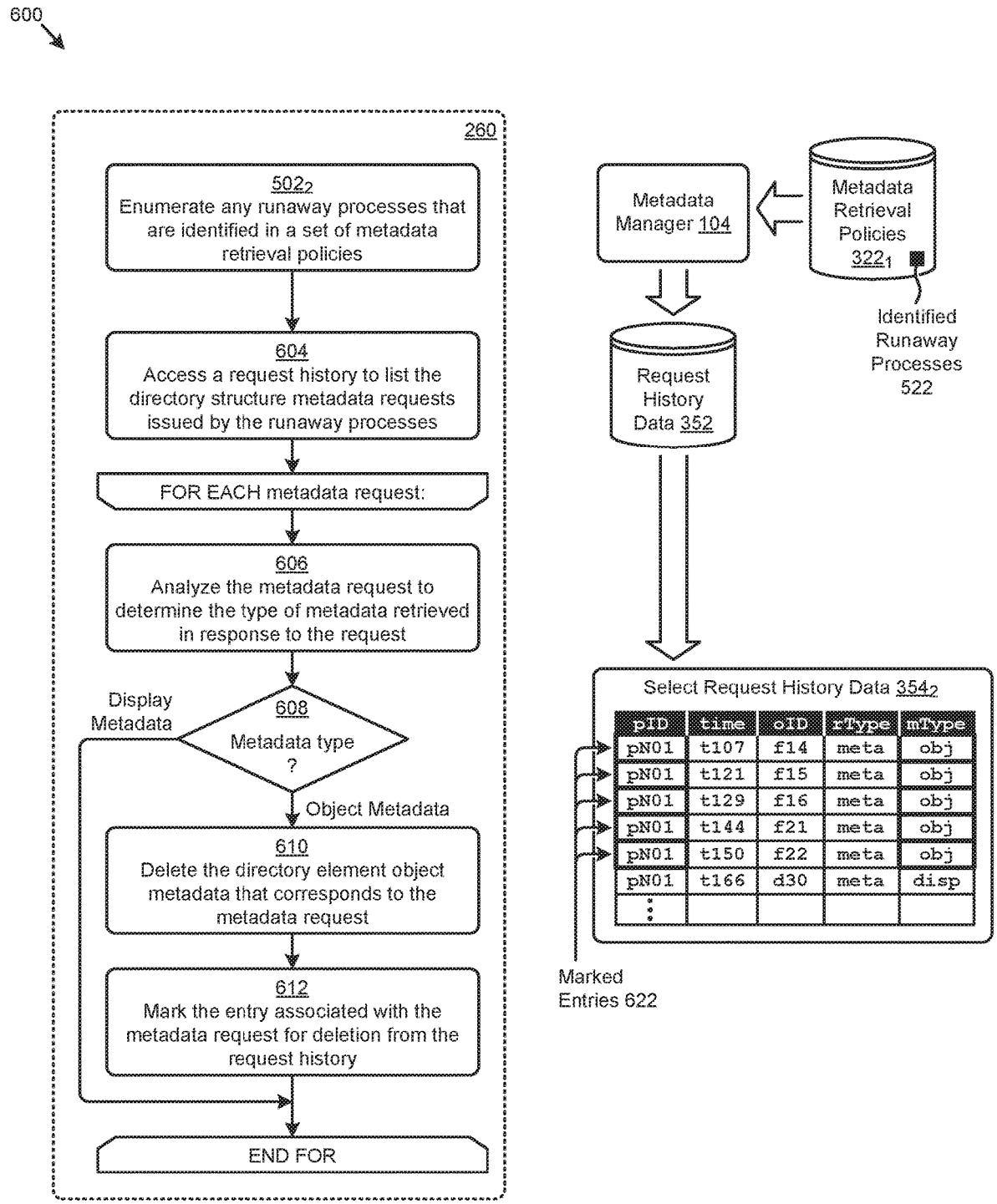
FIG. 6 presents a runaway process remediation technique as implemented in systems that manage runaway retrieval of metadata associated with cloud-based shared content, according to an embodiment.

FIG. 6 presents a runaway process remediation technique 600 as implemented in systems that manage runaway retrieval of metadata associated with cloud-based shared content. As an option, one or more variations of runaway process remediation technique 600 or any aspect thereof may be implemented in the context of the architecture and functionality of the embodiments described herein. The runaway process remediation technique 600 or any aspect thereof may be implemented in any environment.

FIG. 6 illustrates aspects pertaining to intercepting requests from automated processes to prevent unwanted retrieval of metadata associated with directory structures of cloud-based shared content. Specifically, the figure is presented to illustrate one embodiment of certain steps and/or operations that facilitate remediating some or all of the outcomes of directory structure metadata requests that are executed by a runaway process prior to identification of the runaway process (e.g., step 260 of FIG. 2). A representative scenario is also shown in the figure to illustrate an example application of runaway process remediation technique 600.

Runaway process remediation technique 600 can commence by enumerating any runaway processes that are identified in a set of metadata retrieval policies (step $502_2$). For example, a list of identified runaway processes 522 in metadata retrieval policies $322_1$ might be enumerated at metadata manager 104. A request history is accessed to list the directory structure metadata requests that were executed on behalf of the runaway processes (step 604). As an example, if process "pN01" is identified as a runaway process in identified runaway processes 522, request history data 352 can be accessed by metadata manager 104 to list the directory structure metadata requests associated with process "pN01", such as those depicted in select request history data $354_2$. Such a request history can be configured to track any number of processes that perform requests over any portions of the directory structure metadata.

In some situations, runaway processes perform the same requests as non-runaway processes. For example, a collaborator might touch the same directory entry as was accessed by a runaway process. A runaway process remediation technique might check for such an occurrence so as to avoid taking unwarranted remediating actions, such as when the collaborator had purposely caused the subject directory structure metadata request (e.g., by a touch or a click operation).

As such, for each directory structure metadata request associated with a runaway process, the metadata request is analyzed to determine the cause and type of metadata retrieved in response to the request (step 606). If the metadata retrieved is directory element display metadata ("Display Metadata" path of decision 608), then no further action is taken with respect to that metadata request. In this case, the storage capacity consumed by such directory element display metadata might be deemed to be acceptable in consideration of the overall storage capacity and/or the combined costs of removing the display metadata and potentially retrieving it again (e.g., by a process that is not a runaway process) at a later time. If the metadata retrieved is directory element object metadata ("Object Metadata" path of decision 608), then the directory element object metadata that corresponds to the metadata request is deleted (step 610) and the entry in the request history associated with the metadata request is marked for deletion (step 612). In the illustrated scenario, all of the entries (e.g., marked entries 622) of select request history data $354_2$ that are associated with retrieving directory element object metadata (e.g., "mType=obj") are marked for deletion from request history data 352.

ADDITIONAL EMBODIMENTS OF THE DISCLOSURE

Additional Practical Application Examples

Figure 7A:
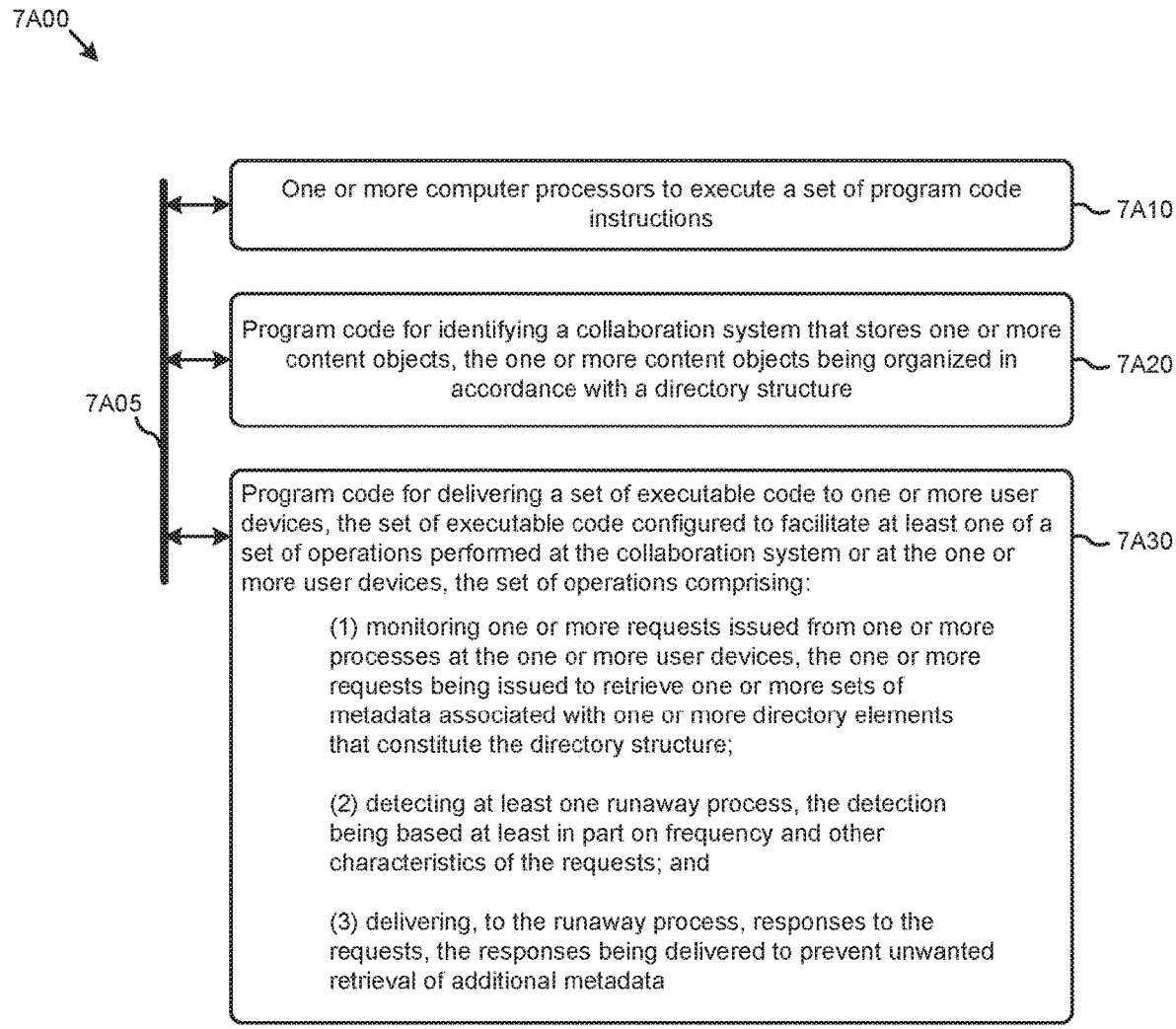
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address unwanted retrieval of shared content directory structure metadata due to automated processes. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: identifying a collaboration system that stores one or more content objects, the one or more content objects being organized in accordance with a directory structure (module 7A20); delivering a set of executable code to one or more user devices (module 7A30), the set of executable code configured to facilitate at least one of a set of operations performed at the collaboration system or at the one or more user devices, and the set of operations comprising: (1) monitoring one or more requests issued from one or more processes at the one or more user devices, the one or more requests being issued to retrieve one or more sets of metadata associated with one or more directory elements that constitute the directory structure; (2) detecting at least one runaway process from the one or more processes, the at least one runaway process being detected based at least in part on the one or more requests; and (3) delivering at least one response to at least one of the requests, wherein the requests are issued by the at least one runaway process, and the response serves to prevent retrieval of at least a portion of the one or more sets of metadata.

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
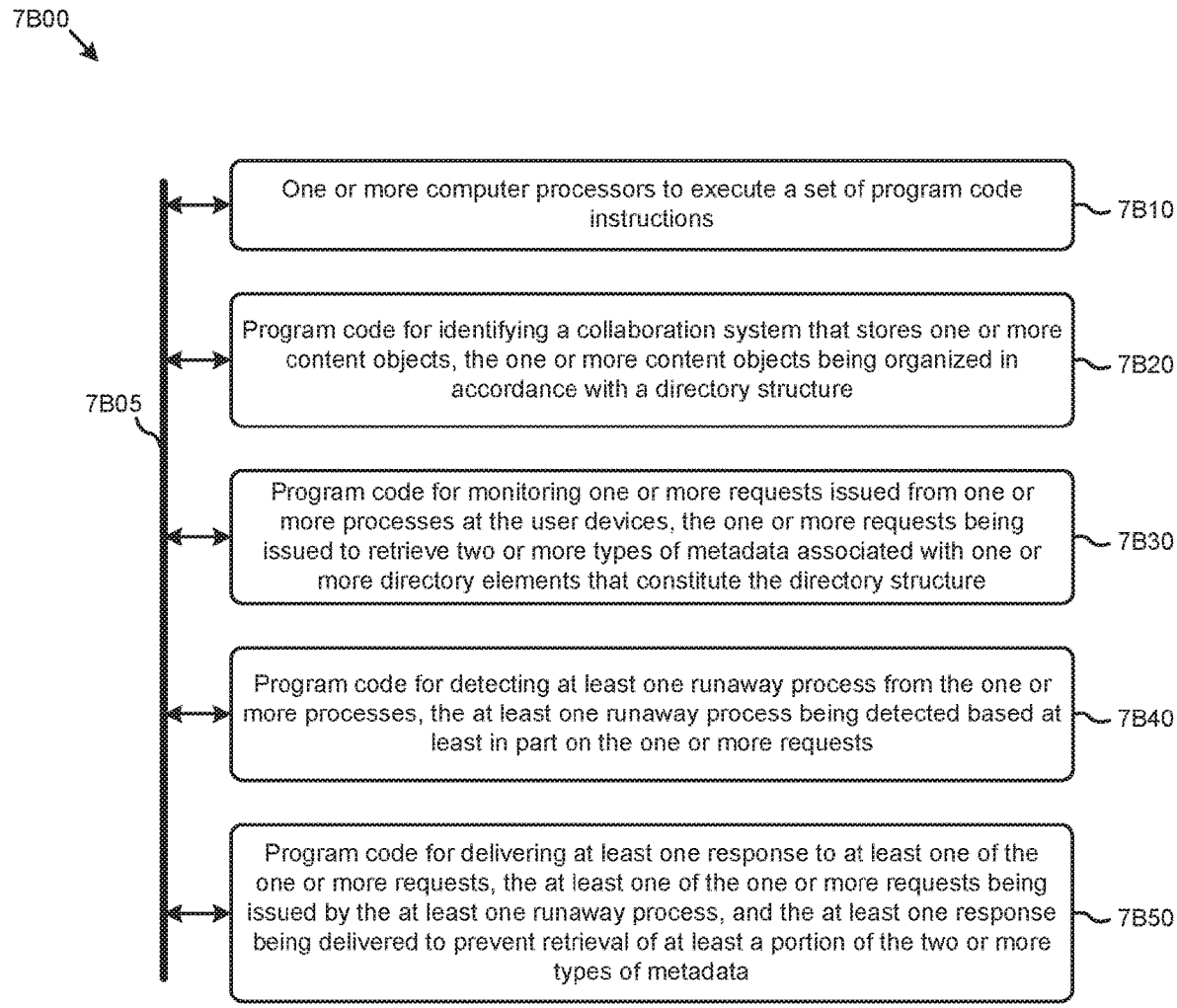

FIG. 7B depicts a system 7B00 as an arrangement of computing modules that are interconnected over communication path 7B05 so as to operate cooperatively to implement certain of the herein-disclosed embodiments. The partitioning of system 7B00 is merely illustrative and other partitions are possible. The shown embodiment implements a portion of a computer system, presented as system 7B00, comprising one or more computer processors to execute a set of program code instructions (module 7B10) and modules for accessing memory to hold program code instructions to perform operations over shared content directory hierarchies, the operations comprising: identifying a collaboration system that stores one or more content objects, the one or more content objects being organized in accordance with a directory structure (module 7B20); monitoring one or more requests issued from one or more processes at the user devices, the one or more requests being issued to retrieve two or more types of metadata associated with one or more directory elements that constitute the directory structure (module 7B30); detecting at least one runaway process from the one or more processes, the at least one runaway process being detected based at least in part on the one or more requests (module 7B40); delivering at least one response to at least one of the one or more requests, the at least one of the one or more requests being issued by the at least one runaway process, and the at least one response being delivered to prevent retrieval of at least a portion of the two or more types of metadata (module 7B50).

System Architecture Overview

Additional System Architecture Examples

Figure 8A:
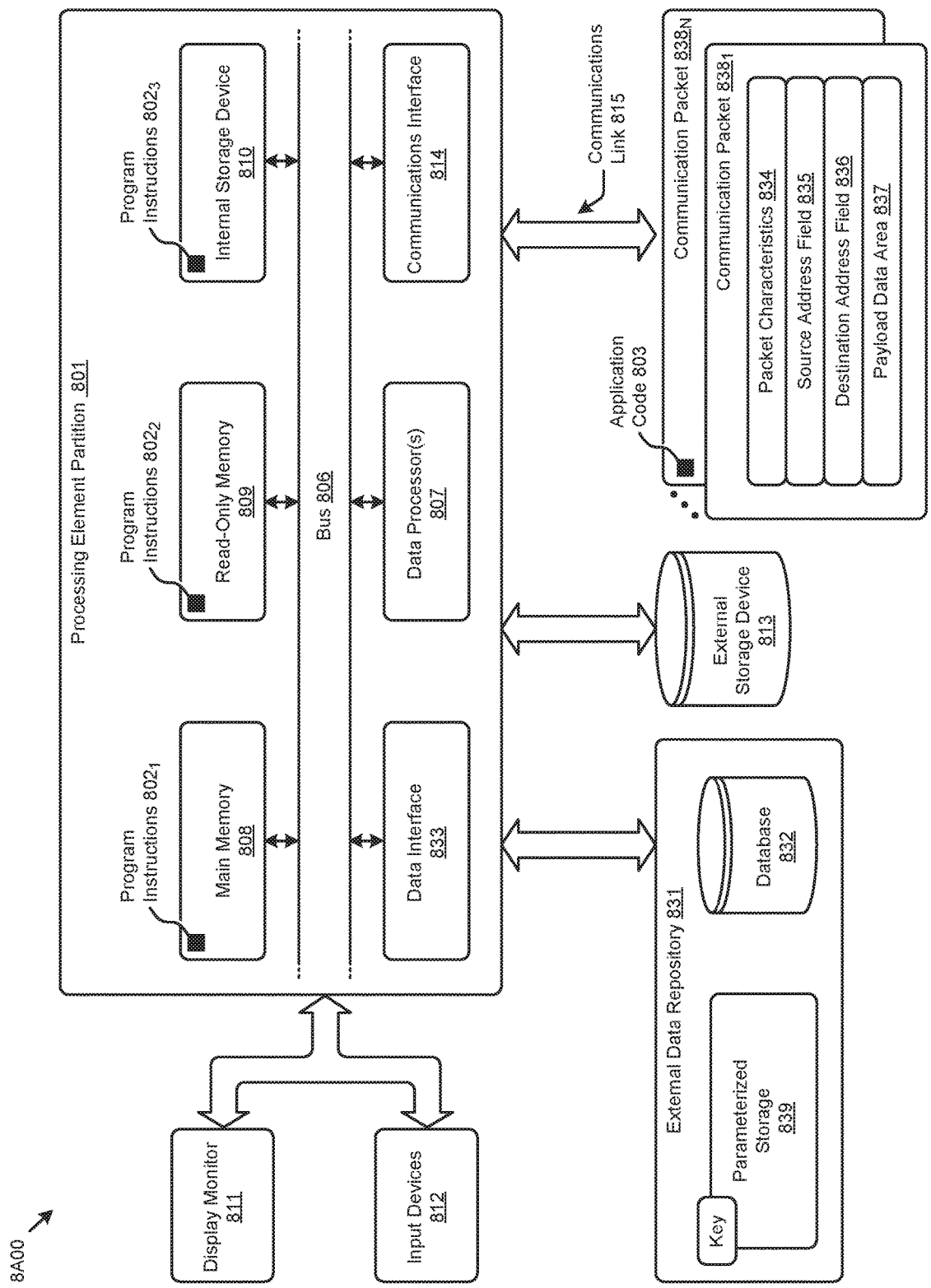
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to managing runaway retrieval of metadata associated with cloud-based shared content. A module may include one or more state machines and/or combinational logic used to implement or facilitate the operational and/or performance characteristics pertaining to managing runaway retrieval of metadata associated with cloud-based shared content.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing runaway retrieval of metadata associated with cloud-based shared content). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to managing runaway retrieval of metadata associated with cloud-based shared content, and/or for improving the way data is manipulated when performing computerized operations pertaining to intercepting requests from automated processes to prevent unwanted retrieval of metadata associated with directory structures of cloud-based shared content.

Figure 8B:
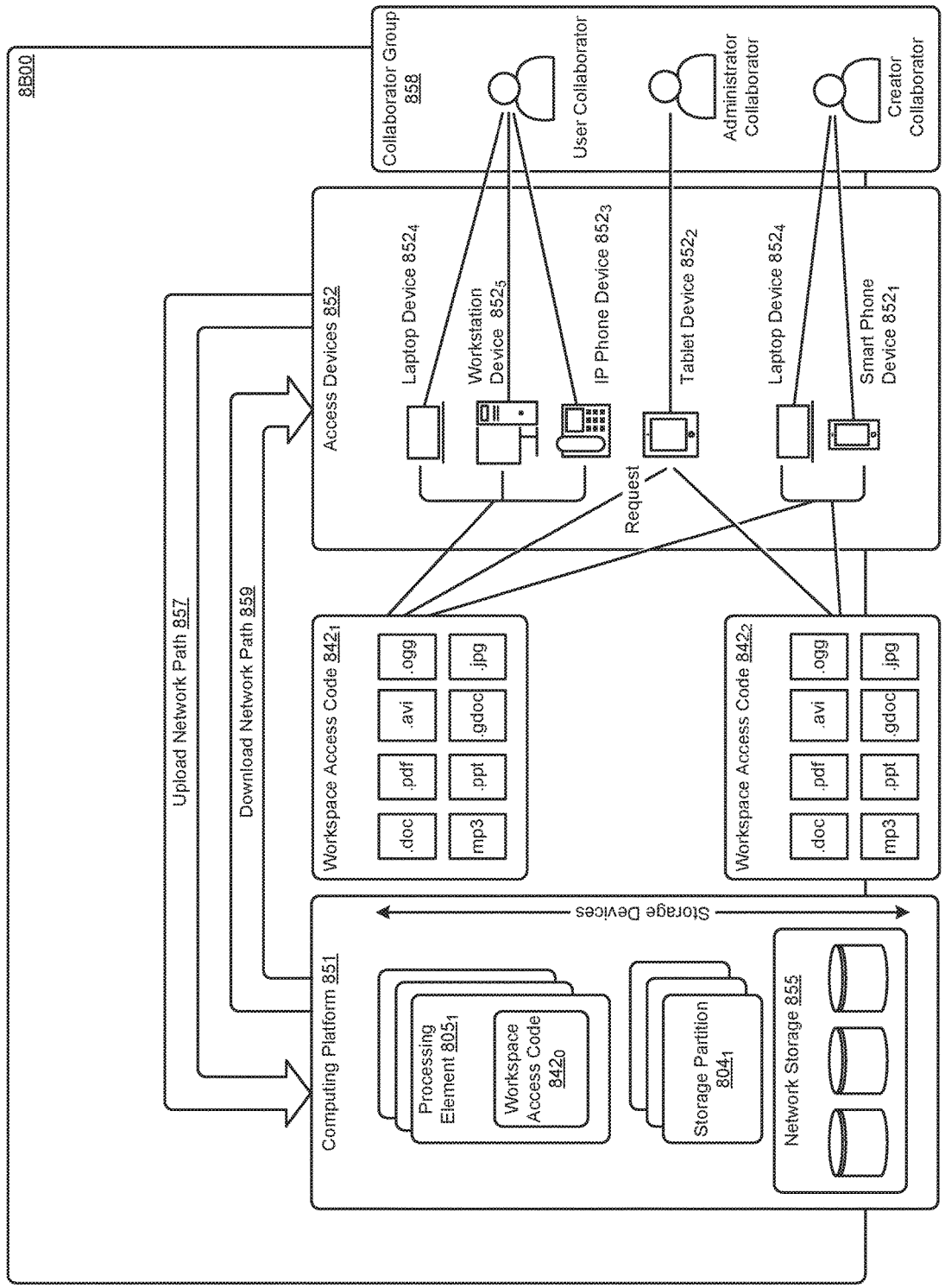

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device $852_1$, etc.), and can be configured to access any type of object. Strictly as examples, such objects can be folders or directories or can be files of any filetype. A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for managing shared content directory hierarchies that are stored on at least one client device, the method comprising:
   maintaining a collaboration system that stores content objects, the content objects being organized in a directory structure;
   monitoring requests issued from processing entities at the at least one client device, the requests being issued to retrieve metadata associated with directory elements that constitute the directory structure;
   detecting a runaway processing entity from the processing entities, the runaway processing entity being detected based at least in part on the requests, wherein the runaway processing entity is detected based at least in part on a request frequency associated with the runaway processing entity; and
   responsive to detection of the runaway processing entity, reducing levels of storage resources consumed at the at least one client device for storage of the metadata caused by the runaway processing entity.

2. The method of claim 1, further comprising blocking further requests from the runaway processing entity.

3. The method of claim 2, wherein the blocking of further requests from the runaway processing entity comprises returning a null value or empty list to at least some of the requests.

4. The method of claim 1, further comprising:
remediating one or more outcomes associated with the runaway processing entity.

5. The method of claim 4, wherein remediation of the one or more outcomes comprises reducing usage of storage resources by:
deleting one or more sets of directory element display metadata, or
deleting one or more sets of directory element attribute metadata, or
deleting one or more of the content objects.

6. The method of claim 5, wherein remediation of the one or more outcomes is based at least in part on a request history, the request history comprising request attributes.

7. The method of claim 1, further comprising:
generating at least one policy corresponding to the runaway processing entity; and
broadcasting the at least one policy to at least one further client device.

8. The method of claim 7, wherein the at least one policy is generated in response to receiving at least one notification from the at least one client device.

9. The method of claim 1, wherein the metadata comprises a first portion of directory element display metadata and a second portion of directory element object metadata.

10. The method of claim 1, wherein the reducing of the levels of storage resources consumed at the at least one client device is caused by at least one of, returning an access denial in response to at least some of the requests, or returning an empty content indicator in response to at least some of the requests.

11. The method of claim 1, wherein the runaway process exceeds at least one threshold parameter value when performing requests for retrieval of the metadata associated with the shared content directory hierarchies.

12. A non-transitory computer readable medium having stored thereon a sequence of instructions which, when executed by a processor causes a set of acts for managing shared content directory hierarchies that are stored on at least one client device, the set of acts comprising:
maintaining a collaboration system that stores content objects, the content objects being organized in a directory structure;
monitoring requests issued from processing entities at the at least one client device, the requests being issued to retrieve metadata associated with directory elements that constitute the directory structure;
detecting a runaway processing entity from the processing entities, the runaway processing entity being detected based at least in part on the requests, wherein the runaway processing entity is detected based at least in part on a request frequency associated with the runaway processing entity; and
responsive to detection of the runaway processing entity, reducing levels of storage resources consumed at the at least one client device for storage of the metadata caused by the runaway processing entity.

13. The non-transitory computer readable medium of claim 12, wherein the set of acts further comprise blocking further requests from the runaway processing entity.

14. The non-transitory computer readable medium of claim 13, wherein the blocking of further requests from the runaway processing entity to avoid storage of further metadata comprises returning a null value or empty list to at least some of the requests.

15. The non-transitory computer readable medium of claim 12, wherein the set of acts further comprise:
remediating one or more outcomes associated with the runaway processing entity.

16. The non-transitory computer readable medium of claim 15, wherein remediation of the one or more outcomes comprises reducing usage of storage resources by:
deleting one or more sets of directory element display metadata, or
deleting one or more sets of directory element attribute metadata, or
deleting one or more of the content objects.

17. The non-transitory computer readable medium of claim 16, wherein remediation of the one or more outcomes is based at least in part on a request history, the request history comprising request attributes.

18. The non-transitory computer readable medium of claim 12, wherein the set of acts further comprise:
generating at least one policy corresponding to the runaway processing entity; and
broadcasting the at least one policy to at least one further client device.

19. A system for managing shared content directory hierarchies that are stored on at least one client device, the system comprising:
a storage medium having stored thereon a sequence of instructions; and
a processor that execute the sequence of instructions to cause a set of acts comprising,
maintaining a collaboration system that stores content objects, the content objects being organized in a directory structure;
monitoring requests issued from processing entities at the at least one client device, the requests being issued to retrieve metadata associated with directory elements that constitute the directory structure;
detecting a runaway processing entity from the processing entities, the runaway processing entity being detected based at least in part on the requests, wherein the runaway processing entity is detected based at least in part on a request frequency associated with the runaway processing entity; and
responsive to detection of the runaway processing entity, reducing levels of storage resources consumed at the at least one client device for storage of the metadata caused by the runaway processing entity.

20. The system of claim 19, wherein the set of acts further comprise blocking further requests from the runaway processing entity.

* * * * *